United States Patent

Murakami et al.

[11] Patent Number: 5,991,468
[45] Date of Patent: Nov. 23, 1999

[54] CARD-TYPE IMAGE SENSOR

[75] Inventors: Taro Murakami, Musashino; Shigeki Okauchi, Kodaira; Hitoshi Nabetani, Yokohama, all of Japan

[73] Assignee: Canon Kabushiki Kaisha, Tokyo, Japan

[21] Appl. No.: 08/690,793

[22] Filed: Aug. 1, 1996

[30] Foreign Application Priority Data

| Aug. 3, 1995 | [JP] | Japan | 7-198675 |
| Aug. 4, 1995 | [JP] | Japan | 7-199571 |
| Oct. 6, 1995 | [JP] | Japan | 7-284424 |
| Nov. 17, 1995 | [JP] | Japan | 7-299794 |

[51] Int. Cl.$^6$ .................................................. H04N 1/04
[52] U.S. Cl. ........................... 382/313; 358/473; 395/892
[58] Field of Search ................................. 358/474, 473; 348/207, 552, 375–376; 235/207; 382/313, 312; 395/892, 893; H04N 1/04

[56] References Cited

U.S. PATENT DOCUMENTS

| 5,438,359 | 8/1995 | Aoki | 348/375 |
| 5,468,952 | 11/1995 | Alexander et al. | 235/492 |
| 5,475,441 | 12/1995 | Parulski et al. | |
| 5,506,617 | 4/1996 | Parulski et al. | 348/207 |
| 5,521,369 | 5/1996 | Kumar | 235/472 |
| 5,644,410 | 7/1997 | Suzuki et al. | |
| 5,666,159 | 9/1997 | Parulski et al. | 348/211 |
| 5,708,515 | 1/1998 | Nishima | |
| 5,708,853 | 1/1998 | Sanemitsu | 348/376 |

FOREIGN PATENT DOCUMENTS

| 1106581 | 8/1989 | Japan . |
| 04295886A | 3/1993 | Japan . |
| 6-178177 | 6/1994 | Japan . |
| 6-276420 | 9/1994 | Japan . |
| 7-121147 | 5/1995 | Japan . |
| 2289555 | 11/1995 | United Kingdom . |

OTHER PUBLICATIONS

English translation of Patent Abstracts of Japan vol. 017, No. 511 (E–1432), Sep. 14, 1993 and JP 05 130475 A (Sony Corp), May 25, 1993.
English translation of Patent Abstracts of Japan vol. 017, No. 094 (E–1325), Feb. 24, 1993 and JP 04 286474 A (Cannon Inc), Oct. 12, 1992.
English translation of Patent Abstracts of Japan vol. 017 No. 85 (E–1322), Feb. 19, 1993 and JP 04 281678 A (Canon Inc), Oct. 7, 1992.
English translation of Patent Abstract s of Japan vol. 095, No. 008, Sep. 29, 1995 and JP 07 121147 A (Hitachi Ltd), May 12, 1995.
English language abstracts of Japanese Patent Applications Nos. 6–178177, 6–276420 and 7–121147.

*Primary Examiner*—Kim Yen Vu
*Attorney, Agent, or Firm*—Morgan & Finnegan LLP

[57] ABSTRACT

An image sensor head having a CCD is rotatably attached to a card body having a computer interface. A DC/DC converter for supplying the image sensor head with electric power is provided so as to be situated outside and external device, such as a computer, when the card body is loaded in the external device. This facilitates the radiation of heat. A shielding case is provided to cover and shield the DC/DC converter. When the card body experiences deformation, the shielding case contacts a metal cover which covers a main board within the card body, thereby preventing excessive bending and assuring electrical safety. Thus, in a card-type image sensor of the type which introduces an image to a computer or the like, the power supply for image sensing purposes radiates heat more effectively and is provided with improved shielding.

29 Claims, 12 Drawing Sheets

CARD-TYPE IMAGE SENSOR

BACKGROUND OF THE INVENTION

This invention relates to an image sensor for introducing an image to a computer or the like. More particularly, the invention relates to a card-type image sensor having an interface for interfacing a computer or the like.

Computers are becoming increasingly small in size and even computers as small as one's hand have made their appearance. Since the limitation upon the size of the recording medium in these small-size computers is greater than in the case of desktop computers, small-size computers are provided with a card slot into which a PCMCIA card can be directly inserted instead of a floppy disk drive.

Usually a memory card or fax card is capable of being inserted into the card slot so that a variety of applications can be accommodated.

In terms of structure, these cards generally have a board and an interface connector as well as a frame-shaped member for holding the board and the connector. The frame is embraced from above and below by two cover members made of two metal plates, whereby the card is shielded.

In order to increase the volume within a thin card such as a PCMCIA card, the machined metal plates constructing the cover members tend to be thin. As a consequence, the cover members have little strength and are readily deformed. When deformation occurs, the cover members contact the parts inside, causing electrical shorting and mechanical damage to the parts within the card. A common method employed to prevent malfunction due to deformation of the cover members is to place insulating sheets on the undersides of the cover members. Another method is to inject silicone rubber between the board and the cover members.

A card-type image sensor the distal end of which is provided with a camera head for introducing an image has recently been proposed, as illustrated in the specification of Japanese Patent Application Laid-open No. 7-121147.

This card-type image sensor has a main body comprising a signal processor constructed on a board, a card connector provided on one end of the board, and a support portion provided on the other end of the board. The camera head is freely rotatably supported on the support portion.

When this image sensor is loaded in and unloaded from a computer, a connection is made by pushing the card into the computer by hand to insert the card and the card can be detached from the computer by pressing an eject button on the computer body when the card is extracted.

An image sensing device such as a CCD requires a plurality of different voltages, such as two voltages of +15 V and −8 V, as the driving voltages. Though an image sensing device that operates at a single voltage of 5 V, which is employed generally in personal computers and the like, has also been announced, performance is inferior to that of the conventional image sensing device. To obtain better image quality, therefore, it is better to use the conventional CCD requiring a plurality of driving voltages. In order to obtain a plurality of voltages, generally a power supply voltage is acquired from the personal computer and a DC/DC converter is used to provide the plurality of voltages. However, since the DC/DC converter is comparatively large in size and generates a large quantity of heat and noise, it is difficult to incorporate the DC/DC converter in a card-shaped body.

In order to improve the image quality of the camera, it is essential to take measures for dealing with noise with regard to the clock from a quartz oscillator mount on the board, the signal lines of the CCD or the like and the circuitry such as the DC/DC converter for converting and supplying power supply voltage. However, with a camera having a card-type interface of the kind described above, merely providing the metal plates as the cover members of the card affords a shielding effect solely with regard to the exterior of the card.

Further, when a card-type camera is mounted in the card slot of a personal computer or the like and a circuit which becomes a source of heat is placed on the portion of the card inserted into the card slot, heat accumulates inside the personal computer, which is itself a source of heat. The result is a problem in terms of dissipating the heat produced.

Furthermore, since the camera portion of the card projects from the personal computer, this portion of the card is susceptible to excessive external force not only when the card is inserted into and withdrawn from the card slot but also during photography. Since a card such as a PCMCIA card has little mechanical strength owing to its thin metal cover members, as mentioned above, the card is likely to be deformed. When a camera is attached to the structure of such a conventional PCMCIA card as an integral part thereof, the overall length of the card is necessarily extended by the length of the attached camera head. A problem encountered with the structure of this conventional card is its poor mechanical strength.

In recent years great efforts have been made with a view to consolidating interfaces used for the purpose of connecting various electronic devices. To this end, standards such as the above-mentioned PCMCIA have been announced. A variety of information processors such as computers capable of accommodating these standards are now being sold. In addition to the above-mentioned card-type camera, various other electronic devices that accommodate these standards have been announced, such as memory cards, infrared communication cards and fax/modem cards.

Many electronic devices of this kind are internally provided with a mixture of analog and digital circuits. This will be described taking an infrared communication card shown in FIGS. 14, 15 and 16 as an example. The infrared communication card is connected to an information processor having a connecting portion in line with the PCMCIA standards and communicates, by infrared rays, with another device having means for infrared communication.

FIG. 14 is a perspective view showing the external appearance of a card for infrared communication, FIG. 15 is a perspective view showing the interior of the card, and FIG. 16 is an exploded perspective view showing the architecture of the card. The card has an PCMCIA connector 71 for connecting an information processor having a connecting portion in line with PCMCIA standards, and a card frame 72 having a board supporting portion 72a which supports a circuit board 76, described later, and a spring positioning hole 72b.

Metal plates 73 serve as covers and shielding plates. The card further includes such component parts as a digital circuit 74 and an analog circuit 75 mounted on the circuit board 76. A coil spring 78 is inserted into the spring positioning hole 72b and is adapted to electrically connect, by its inherent resilience, a grounding pattern 77 provided on the circuit board 76 and the metal plate 73 constituting the shielding plate. Numeral 79 denotes an infrared diode.

In a case where the infrared communication card constructed as set forth above is connected to an information processor having a connecting portion in line with the PCMCIA standards, the infrared communication card is such that digital data sent from the information processor via a PCMCIA connector are converted to digital data by the above-mentioned digital circuit, and the infrared diode 79 is fired by the analog circuit to transfer data. In order to arrange it so that the card will not be affected by noise produced by the information processor or by external equipment, and in order to prevent the internal circuitry from being damaged by static electricity, upper and lower cases are constructed by the metal plates 73 and these are grounded to the circuit board 76 by the coil spring 78.

In order to raise the processing speed of information processors, however, much higher frequencies are being used in the internal circuitry. Consequently, when an electronic device having a mixture of the analog and digital circuits mentioned above is used upon being connected to an information processor, the analog and digital circuits are disposed without taking any special consideration. As a result, the analog circuit, which is readily susceptible to the effects of noise, may malfunction in the presence of noise.

Further, since assembled parts such as the coil spring 78 are required, the efficiency of the assembly operation suffers.

SUMMARY OF THE INVENTION

An object of the present invention is to provide a card-type image sensor used upon being connected to an information processor such as a computer, wherein the image sensor is capable of radiating heat effectively.

Another object of the invention is to realize efficient radiation of heat by adopting a circuit arrangement in which elements (such as a DC/DC converter) that become sources of heat at the time of operation are situated outside the information processor when the card-type image sensor has been connected to the information processor.

Another object of the invention is to reduce noise effectively by providing a shielding plate which shields parts arranged so as to be situated outside the information processor when the card-type image sensor has been connected to the information processor.

A further object of the invention is to reduce the occurrence of electrical malfunctions owing to deformation produced when an external force is applied to the card-type image sensor.

Yet another object of the invention is to provide a card-type image sensor in which malfunction is prevented by making it possible to effectively protect analog circuitry from high-frequency noise produced by digital circuitry.

Yet another object of the invention is to protect analog circuitry more effectively by providing a shielding member which covers the main body of the card.

Yet another object of the invention is to provide a card-type image sensor in which the shielding member is formed of a resilient body and is made to contact a metal cover which covers the main body of the card, whereby it is unnecessary to ground the metal cover by a coil spring or the like, the result being a simplified assembly operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
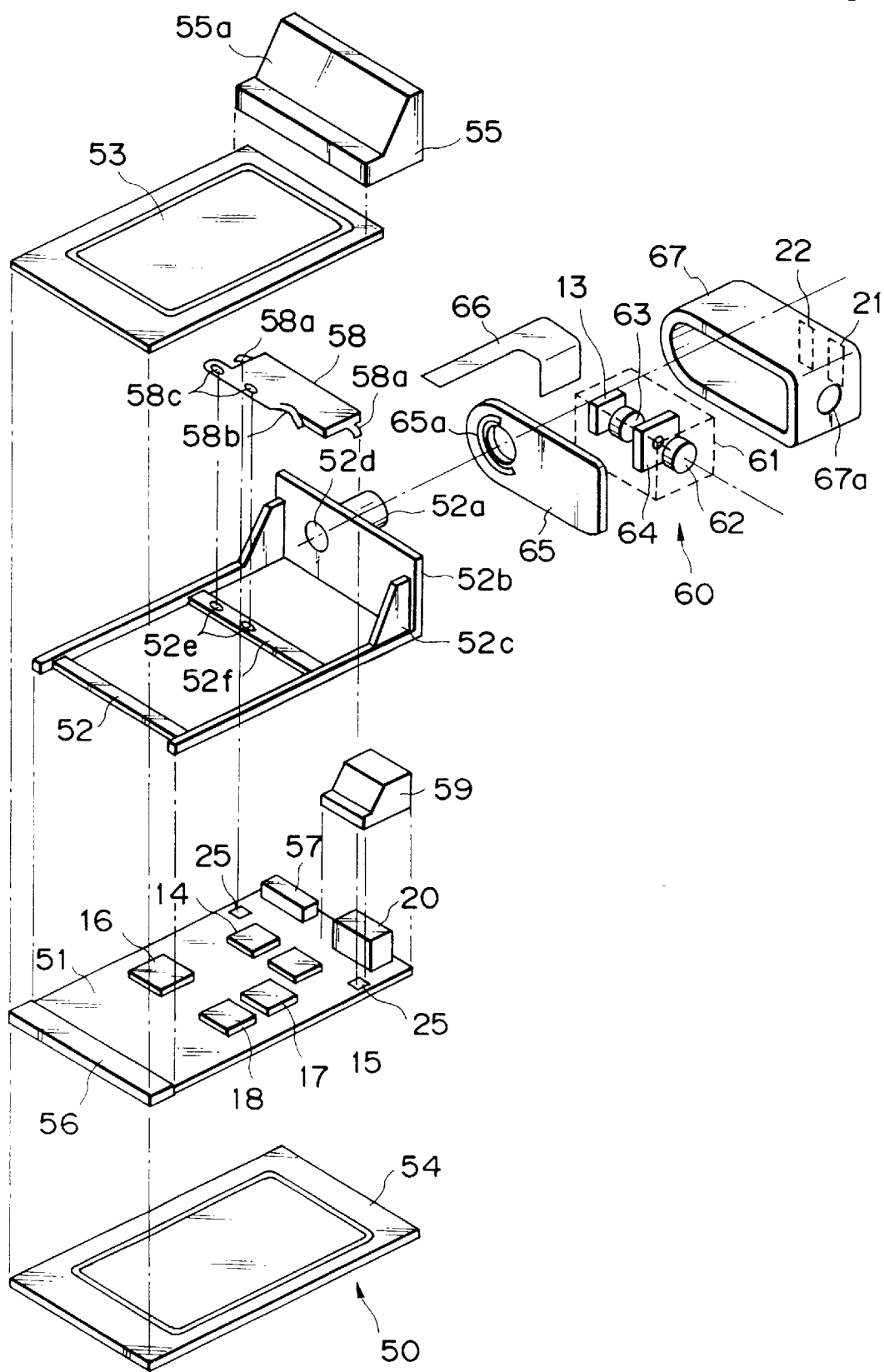
FIG. 1 is an exploded perspective view showing the structure of a card-type image sensor according to an embodiment of the invention.
Figure 2:
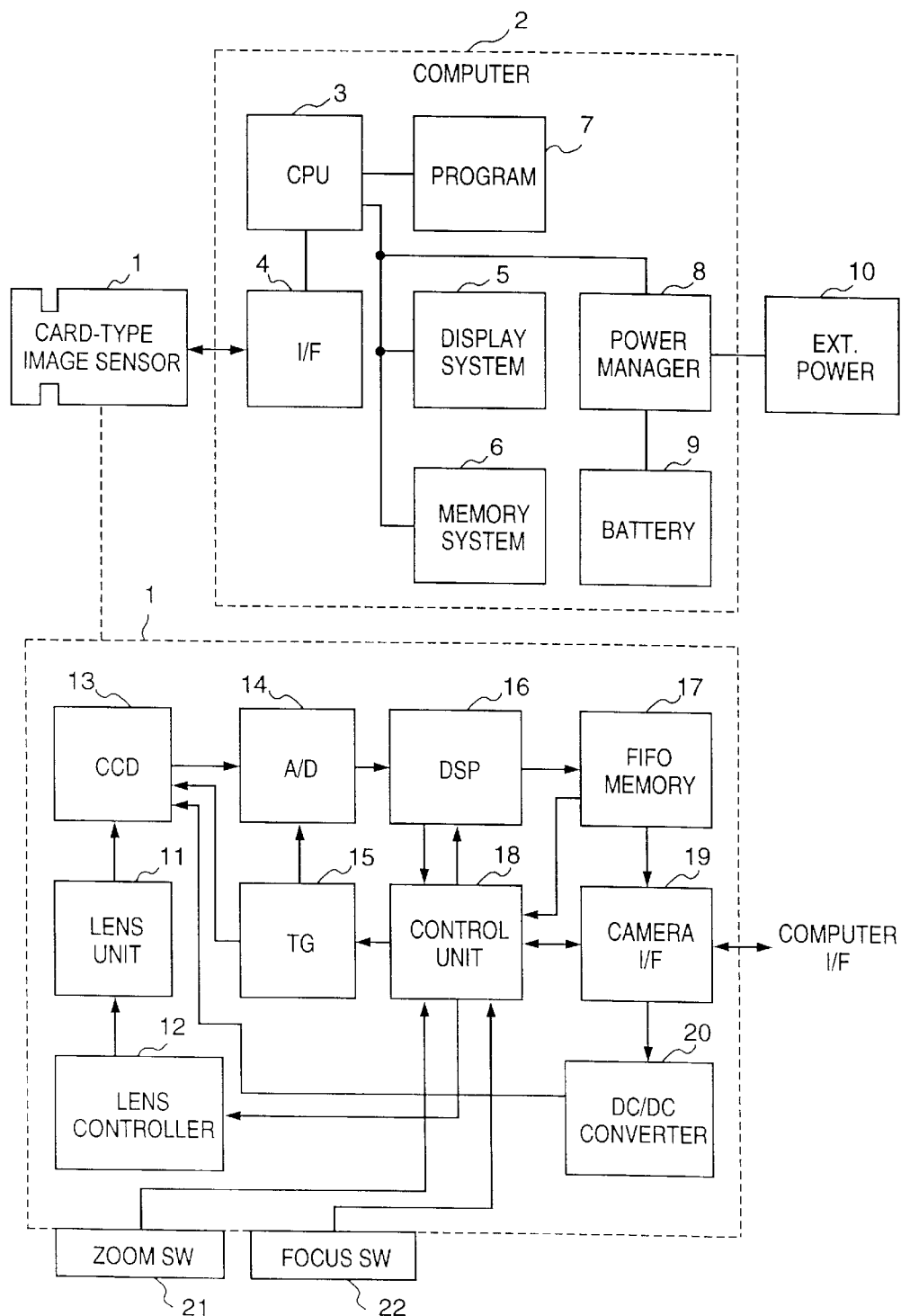
FIG. 2 is a block diagram showing the architecture of the circuitry in the card-type image sensor of FIG. 1.
Figure 3A:
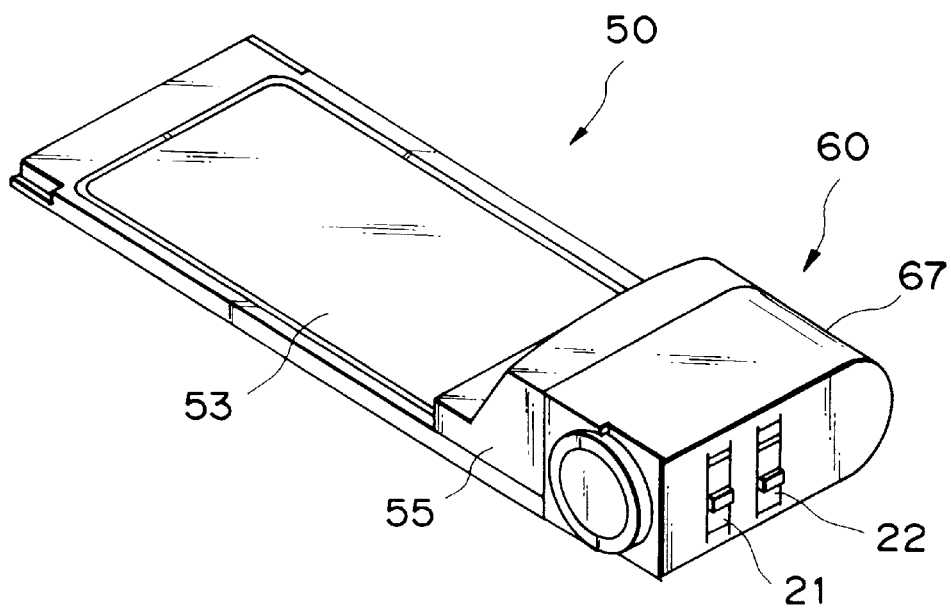
FIGS. 3A and 3B are perspective views showing the external appearance of the card-type image sensor shown in FIG. 2.
Figure 3B:
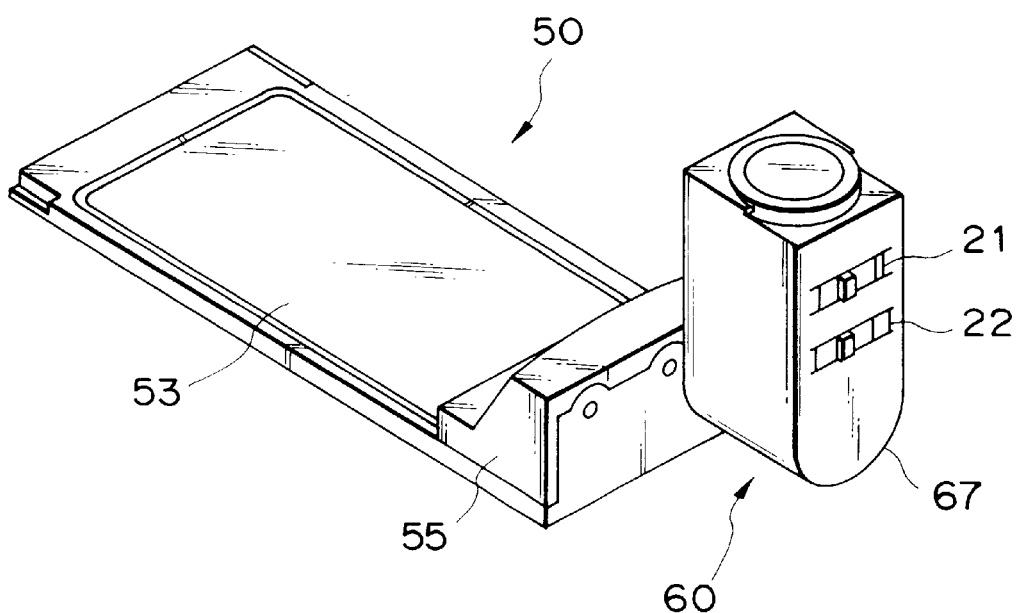

A card-type image sensor according to an embodiment of the invention will be described below. FIG. 1 is an exploded perspective view showing the structure of the card-type image sensor, FIG. 2 is a block diagram showing the architecture of the circuitry in the card-type image sensor of FIG. 1, and FIGS. 3A and 3B are perspective views showing the external appearance of the card-type image sensor. FIGS. 3A and 3B illustrate different orientations of an image sensor head.

The card-type image sensor has an image sensor head 60 which photoelectrically converts a light image and produces an electrical image information signal, and a card body 50 mounting a signal processing portion for processing the image information signal and producing a predetermined image signal, and a connecting portion for outputting this image signal to an external device. A DC/DC converter for supplying electrical power to the image sensor head 60 is mounted on the board of the card body 50. The DC/DC converter is placed on the board so as to be situated on the outer side of a computer when the card-type image sensor is connected to the computer.

The card-type image sensor is provided with a shielding case for covering and shielding the DC/DC converter. A portion of the shielding case is situated between the above-mentioned board and a cover made of metal and is capable of contacting the cover.

Furthermore, the card-type image sensor has an analog circuit component and a digital circuit component mounted separately on the circuit board. The analog circuit component is placed at a position remote from a connector for connecting the image sensor to the external device and is protected by a shielding plate 58 (see FIG. 1).

The card-type image sensor further includes covers 53, 54 (conductors for covering at least part of a case) which cover part of the above-mentioned components, and a frame 52 which supports the covers 53, 54 and the circuit board. The covers 53, 54 are electrically connected to the shielding plate 58, and the shielding plate 58 is electrically connected to a prescribed terminal (a ground pattern) of the circuit board.

The circuitry will be described first. Shown in FIG. 2 are a card-type image sensor 1 internally provided with an optical system and a signal processing system, and a computer 2, which is an external device. The computer 2 includes a CPU 3, an interface (I/F) 4 for connecting the card-type image sensor 1 to the computer 2, a display system 5, a memory system 6, an operating program 7 stored in a rewritable memory such as a RAM or the like to control the computer 2, a power manager system 8 and a battery 9. An external power supply 10 is capable of supplying power to the computer 2.

The internal architecture of the card-type image sensor 1 will be described next. As shown in FIG. 2, the card-type image sensor 1 includes a lens unit 11 having a zoom lens, a focusing lens and a diaphragm mechanism, and a lens controller 12 for driving the lens. The lens controller 12 includes a well-known automatic focusing device, automatic exposure device and automatic vibration preventing device (a device which prevents blurring caused by hand movement). The card-type image sensor further includes a CCD (image sensing device) 13 for photoelectrically converting a light image and producing an electrical image information signal, an A/D converter 14 for converting the analog image information signal to a digital signal, a timing generator (TG) 15 which generates a timing signal for control purposes, a digital signal processor (DSP) 16 for processing the digital image information signal and producing a predetermined image signal, a FIFO memory 17, a control unit 18 for controlling the overall card-type image sensor, and an interface (camera I/F) 19 for the purpose of external connection. The interface 19 serves as a connecting portion for outputting the above-mentioned digital image signal.

The card-type image sensor further includes a DC/DC converter 20 for converting the power supply voltage, which is supplied by the computer 2, to an optimum voltage to drive the CCD 13, a zoom switch (zoom SW) 21 and a focus switch (focus SW) 22. The switches 21, 22 are connected to the control unit 18. This makes possible lens control conforming to the operation of the switches 21, 22.

The image sensor of this embodiment is configured to include the card-type image sensor 1 and computer 2, which are capable of being separated from each other. More specifically, the interface 4 is constituted by a PCMCIA card slot. Further, part of the card-type image sensor 1 has a shape identical with that of a PCMCIA card. When the card-type image sensor 1 and computer 2 have been connected together, photography is possible in a state in which the lens unit projects from the computer 2. The card-type image sensor 1 and computer 2 can be separated from each other by pressing an eject button (not shown) provided on the computer 2.

The specific structure of the card-type image sensor 1 will now be described with reference to FIG. 1. Components identical with those shown in FIG. 1 are designated by like reference characters. The card-type image sensor 1 is constituted by the generally card-shaped card body 50 and the image sensor head 60 having the CCD 13.

The card body 50 will be described first.

A main board 51 is soldered to each terminal of a connector 56. The main board 51 mounts analog circuitry, namely the A/D converter 14 and the timing generator 15, digital circuitry, namely the digital signal processor (DSP) 16, FIFO memory 17 and control unit 18, the DC/DC converter 20, which is a power supply component, and a flexible connector 57. As shown in FIG. 1, the analog and digital circuit portions are dispersed on the board, with the analog circuits being mounted at positions farthest from the connector 56 for connection to the external device.

A card frame 52 has the connector 56 connected to it and holds the main board 51. The card frame 52 has a substantially frame-shaped structure and, on the side opposite that on which the connector 56 is disposed, is integrally provided with a frame wall 52b having an upstanding support 52a for rotatably supporting the image sensor head 60. The frame portion of the card frame 52 has rib portions 52c for both sides of the frame wall 52b. Further, the rotary support 52a is formed to have a passageway 52d through which a flexible circuit board 66, described later, is passed. Projections (fixing members) 52e for fixing the shielding plate 58, described later, are provided on a support portion 52f which supports the main board 51.

The covers 53, 54 are made of metal and sandwich the main board 51 and card frame 52 from above and below and are attached to the card frame 52 by bonding or by being joined mechanically. The covers serve also as shields against noise and the like. The outer geometry of the card portion is decided by the covers 53, 54 and part of the card frame 52 and allows the card to be inserted into the card slot of the computer 2.

A case 55 is fixed to the card frame 52 as by being fastened to it by screws. The case 55 has a finger catch 55a and covers the connection between the card portion and the image sensing portion. The DC/DC converter 20 and flexible connector 57, which are components that are comparatively large in terms of height, are disposed at locations in the case 55 that correspond to the main board 51. Further, the DC/DC converter 20 serving as a power supply for supplying the image sensor head 60 with electric power is a component which produces heat.

The shielding plate 58, which covers the A/D converter 14 and timing generator 15 constructing the analog circuitry, has holes 58c into which the projections 52e of the card frame 52f are fitted in order to position the card frame, and a resilient portion 58a for contacting the circuit board. The resilient portion 58a contacts the ground pattern 25 provided on the main board 51, whereby the main board 51 and shielding plate 58 are electrically connected. The shielding plate 58 has a resilient portion 58b for establishing an electrical connection with the covers 53, 54.

A shielding case 59 made of metal covers and shields the DC/DC converter 20 and is placed at a position which corresponds to the circuitry of the DC/DC converter 20. Further, part of the shielding case 59 is situated between the main board 51 and covers 53, 54 and is capable of contacting the covers 53, 54.

The image sensor head 60 will now be described.

An optical image sensing unit 61 is provided in such a manner that a zoom lens 62 and focusing lens 63 of the lens unit 11 are capable of being moved along the optic axis, and includes a diaphragm unit 64 disposed between the zoom lens 62 and focusing lens 63. The optical image sensing unit 61 is provided with the CCD 13 at a position at which an image is formed by the light that has passed through the focusing lens 63 and diaphragm unit 64. Furthermore, the optical image sensing unit 61 includes a motor for driving the zoom lens, a motor for driving the focusing lens, an IG meter and the lens controller 12. The zoom lens 62, focusing lens 63 and diaphragm unit 64 are driven by the lens controller 12.

A rotary plate 65 has the optical image sensing unit 61 attached thereto. The rotary plate 65 is resiliently held by a clamp portion (not shown) connected to the rotary support 52a of the card frame 52 and is attached so as to be free to turn relative to a rotary support portion 52a. Further, the side of the rotary plate 65 facing the card frame 52 is provided with a groove 65a. A projection (not shown) provided on the side of the frame wall 52b facing the rotary plate 65 mates with the groove 65a. The projection on the card frame 52 moves in the groove 65a in conformity with rotation of the rotary plate 65, as a result of which the image sensor head 60 rotates. In this embodiment, the optic axis may be rotated through 180° from the horizontal attitude to the horizontal attitude. FIG. 3B illustrates the head after it has been rotated by 90° from the horizontal attitude shown in FIG. 3A.

The flexible board 66 sends the output of the CCD 13 to the main board 51 on the side of the main body and sends lens and diaphragm drive instructions from the side of the main body to the side of the image sensor head. The flexible board 66 is passed through the passageway 52d of the rotary support portion 52a protruding from the card frame 52 toward the image sensor head 60 and the end of the board 66 is connected to the flexible connector 57 on the main board 51.

An image sensor case 67 forms the case of the image sensor head 60 and is provided with an opening 67a at a location corresponding to the optic axis. The case 67 is provided with the zoom switch 21 and focusing switch 22 in a plane perpendicular to the axis of rotation. Switch status is transmitted to the side of the main body via the flexible board 66.

The center of rotation of the image sensor head 60 is decided in such a manner that the image sensor head 60 will not protrude from the lower side of the card body 50 when the head 60 is turned. More specifically, if we let R represent the distance from the bottom side of the card body to the center of rotation, the shape of the image sensor head 60 on the side opposite the opening 67a is given such dimensions that the distance from the center of rotation will not exceed R. The external appearance of the card-type image sensor 1 having the architecture described above is as shown in FIGS. 3A, 3B.

When the card-type image sensor 1 is inserted into the card slot of the computer 2 and the card-type image sensor 1 supplied with electric power, the image of a subject formed on the CCD 13 through the lens unit 11 is converted to digital data by the A/D converter 14. These digital data are subjected to digital processing by the signal processor 16, the processed data are recorded temporarily in the FIFO memory 17 and then the data are transmitted to the computer 2 through the interface 19 in the order in which they were recorded. At this time the interface 19 on the camera side is connected to the interface 4 on the computer side.

Timing pulses sent by the timing generator 15 are used in controlling the acquisition of image data from the A/D converter 14. The intervals of the timing pulses sent by the timing generator 15 are controlled by the control unit 18.

Focus control and exposure control is performed by the control unit 18 on the basis of the signal representing the captured image, and the captured-image data are sent to the computer 2 via the interface 4 so that the data can be displayed on the display system 5 or recorded in the memory system 6.

Figure 4:
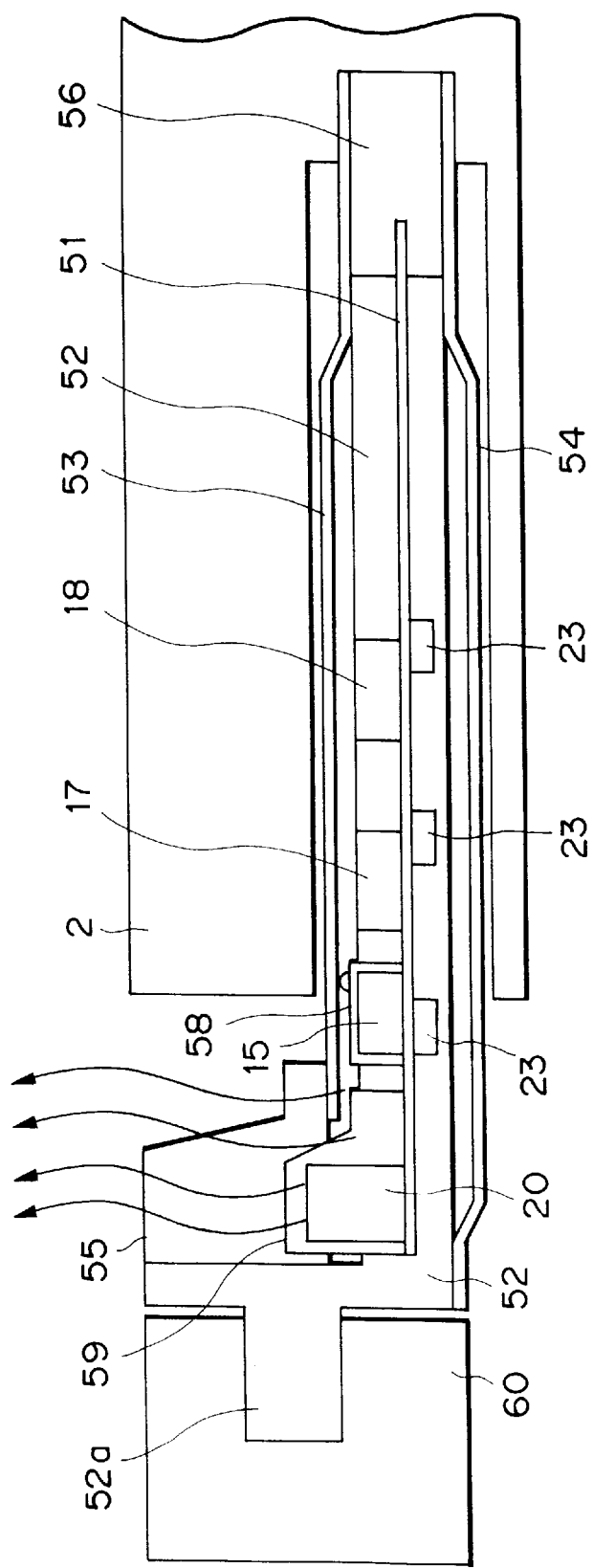
FIG. 4 is a sectional view showing the card-type image sensor of the embodiment in a state attached to a computer.

FIG. 4 is a diagram illustrating the card body 50 of the card-type image sensor 1 in a state loaded in the slot of the computer 2. Components identical with those shown in FIGS. 1 and 2 are designated by like reference characters.

The shielding case 59 covers the entire circuitry of the DC/DC converter 20. Part of the shielding case 59 is of reduced height and fits under the cover 53, where it is the highest of the components (with the exception of the shielding plate 58) under the cover 53. The shielding case 59 is electrically connected to a GND terminal on the main board 51 and is grounded thereby. In this embodiment, part 23 of comparatively small height, such as a chip resistor, capacitor and transistor, are mounted on the underside of the main board 51. It should be noted that if the power supply circuit which includes the DC/DC converter 20 has small components, it will be possible to mount these components in the reduced-height portion of the shielding case 59.

If an outside force acts upon the card-type image sensor 1 and causes the overall card to bend or twist, the covers 53, 54 will experience deformation and will be deformed on the side of the main board 51. At this time the cover 53 contacts the shielding case 59, which has the largest height from the main board 51 and therefore is closest to the cover 53. However, since the shielding case 59 is made of metal and has a size smaller than that of the cover 53, the shielding case 59 deforms less readily than the cover 53 and prevents, to a certain extent, the deformation of the cover 53, as a result of which the other component parts can be prevented from being adversely affected. Further, since the shielding case 59 is electrically grounded, electrical accidents due not occur.

The DC/DC converter 20, which is also a source of heat, is disposed at a position at which it protrudes from the slot of the computer 2. As a result, heat produced by the DC/DC converter 20 is effectively radiated into the atmosphere through the shielding case 59 and case 55.

Thus, the heat radiating effect is improved by placing power supply components such as the DC/DC converter 20, which is a source of heat, at the portion of the card protruding from the card slot, which portion forms the connection between the card portion and the image sensing portion. Furthermore, noise which penetrates the other components is reduced and an excellent shielding effect is obtained.

Furthermore, noise from the power supply components such as the DC/DC converter 20 can be effectively suppressed by the shielding case 59, and noise that penetrates the other circuitry inside the card-type image sensor 1 is reduced. This improves the image quality of the captured image.

Further, when the metal covers 53, 54 of the card-shaped portion of the camera are deformed by an outside force or the like, the cover 53 abuts against the shielding case 59.

Since both the cover 53 and the shielding case 59 are grounded, electrical troubles will not occur. Further, since the shielding case 59 serves also as reinforcement, strength against deformation is provided. As a result, the cover will not contact and deform the other components and accidents due to short circuits are prevented.

In this embodiment, an arrangement is described in which the shielding case 59 is provided on only one side of the main board 51. However, by providing shielding cases on both sides of the main board 51, a greater degree of electrical and mechanical safety against deformation can be provided.

In this embodiment, the optical image sensing unit 61 described includes zoom and focusing lenses and automatic exposure means. However, an arrangement which includes a single focal point, universal focusing and fixed diaphragm may be adopted to suppress power consumption. In this case the lens controller 12 will be unnecessary and signal lines needed to control the lenses also will not be required. As a result, the flexible board 66 can be reduced in size, thus making it possible to lower cost. The invention is of course applicable to such an arrangement.

In this embodiment, the DC/DC converter 20 is provided on the side of the card body 50. However, it is possible to provide the DC/DC converter 20 on the side of the image sensor head 60. In this case, the comparatively large components would be provided on the side of the image sensor head 60, which has a thickness greater than that of the main body. As a result, space is used more efficiently and an even greater reduction in size can be achieved.

Thus, as described above, power supply components such as a DC/DC converter are placed at the connection between the card portion and the image sensing portion. This makes it possible to place components that are sources of heat at a location protruding from the card slot. Such a location is advantageous in terms of radiating heat.

Further, noise produced by the power supply components can be suppressed by shielding the power supply elements, such as the DC/DC converter, by means of the shielding case. This reduces the noise that penetrates other circuits inside the image sensor head and improves the image quality of the captured image. The shielding case is capable of providing double shielding in cooperation with the cover members of the case of the card portion. This furnishes an improved shielding effect with regard to external phenomena.

If a metal cover of the card-shaped portion is deformed by an outside force, the cover contacts the shielding case. However, since both the cover and the shielding case are grounded, no trouble occurs. Further, it is possible to suppress deformation by the strength of the shielding case, and the cover will not contact and deform the other components, thus reducing accidents due to short circuits.

The card-type image sensor 1 according to this embodiment is characterized not only by the shielding case 59 but also by means effective in dealing with noise. This will be described with reference to FIG. 1.

The circuitry of the computer 2 is driven at a high frequency. The circuitry peripheral to the connector 56 connected directly to the card slot of the computer 2 is readily susceptible to the effects of noise since it is disposed at a position close to the circuitry driven at high frequency. In this embodiment, however, as described in connection with FIG. 1, the circuitry on the main board 51 is divided into analog and digital circuits and the analog circuitry, which is susceptible to the effects of noise, is disposed at a position remote from the connector 56 so that the effects of noise can be minimized. Furthermore, since the analog circuitry is provided with the shielding plate 58, shielding against noise can be achieved with assurance.

Further, the shielding plate 58 is formed from a resilient member and the resilient portion 58a thereof is made to resiliently contact the ground pattern 25 on the main board 51. As a result, the main board 51 and shielding plate 58 can be electrically connected without being soldered together. Since the metal plate (cover 53) and main board 51 are connected by the resilient portion 58b via the shielding plate 58, a coil spring is no longer required, thereby facilitating the assembly operation.

Thus, as described above, the analog and digital circuit portions are mounted separately on the circuit board and the analog circuit portion is disposed remote from the connector for the purpose of the connection to the external device. This protects the analog circuitry from high-frequency noise and prevents malfunction. Furthermore, noise can be shut out reliably by covering the analog circuitry with the shielding plate 58.

Further, an electrical conductor (the cover 53) for covering part of the case is provided, the shielding plate 58 is electrically connected to the cover 53 and so is the circuit board. As a result, the overall circuitry can be protected against noise and static electricity and the analog circuitry can be protected with certainty.

Furthermore, the frame is provided with the support portion 52f which supports the circuit board, and the shielding plate 58 can be secured to the support portion 52f. This makes it possible to secure the shielding plate 58 at a desired position in reliable fashion so that a coil spring will no longer be necessary. This facilitates the assembly operation.

Further, the shielding plate 58 is made a resilient member and is made to contact the circuit board in resilient fashion. This makes it possible to connect the circuit board and the shielding plate without soldering, thereby facilitating assembly.

Figure 5A:
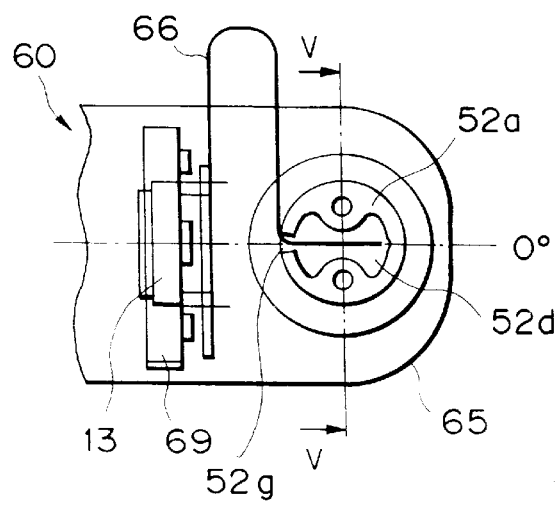
FIGS. 5A through 5D are diagrams for describing the state of connection of a flexible board in an image sensing head.

A method of mounting the flexible board 66 in the image sensor head 60. Since the image sensor head 60 is attached to the card body 50 so as to be rotatable, as mentioned above, special measures are needed to mount the flexible board 66. FIG. 5A illustrates the flexible board 66 in the mounted state. As described above, the card body 50 has the rotary support portion 52a for rotatably supporting the image sensor head 60, and the passageway 52c through which the flexible board 66 is passed. The rotary support portion 52a has a cut-away portion 52a through which the flexible board 66 is passed. The rotary plate 65 is supported on the rotary support portion 52a by passing the support portion through the plate. A CCD holding plate 69 which holds the CCD 13 is secured to the rotary plate 65.

Figure 5B:
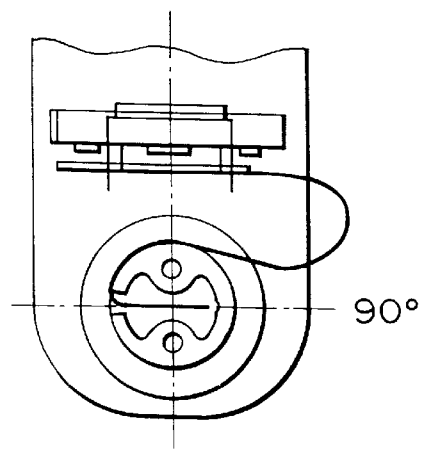
Figure 5C:
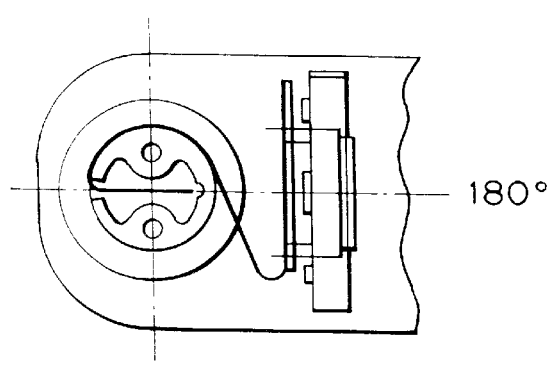
Figure 5D:
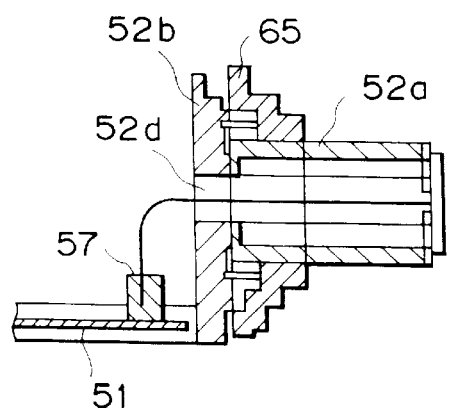

In the structure described above, the image sensor head 60 is so adapted as to be rotatable from 0 to 180° relative to the card body 50. FIGS. 5A, 5B and 5C illustrate the wiring states of the flexible board when the image sensor head 60 is rotated by 0°, 90° and 180°, respectively. FIG. 5D is a sectional taken along line B—B of FIG. 5A.

As shown in FIGS. 5A through 5D, the flexible board is soldered to the CCD 13 and is connected to the flexible connector 57 upon being passed through the cut-away portion 52g and passageway 52d. The flexible board 66 is designed to have such a length that slack will will be eliminated at exactly 180° of rotation.

In the case of this example, the structure is such that slack is maximum at 0° of rotation, as shown in FIG. 5A. The amount of slack decreases as the angle of rotation increases until there is no slack at 180° of rotation, as depicted in FIG. 5C. Accordingly, the conventional structure is such that the case is enlarged so that it will not be contacted by the flexible board 66 when the slackened board is rotated, or the flexible board 66 is allowed to rub against the case (the image sensor case 67).

However, if the image sensor case 67 is made so large that it will not be contacted by the flexible board 66, it will be very difficult to reduce the size of the apparatus. Further, if the flexible board 66 develops more slack than expected, the board may rub against the case 67 excessively, thereby possibly causing trouble such as the severing of lines or wiring.

Accordingly, in this embodiment, further consideration is given to the method of mounting the flexible board so that the amount of board slack can be minimized and the size of the apparatus reduced.

The details of the connecting portion of flexible board 66 will be described with reference to FIGS. 6A through 6D.

Figure 6A:
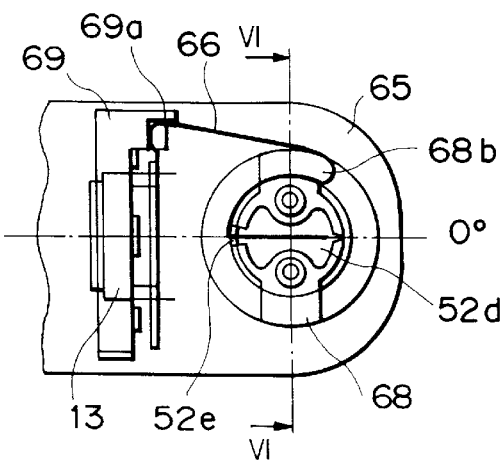
FIGS. 6A through 6D are diagrams for describing a more preferred connection of the flexible board in the image sensing head.
Figure 6B:
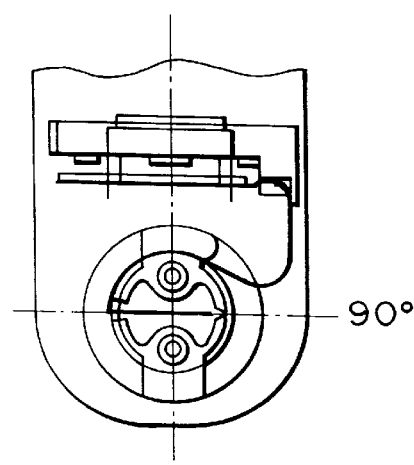
Figure 6C:
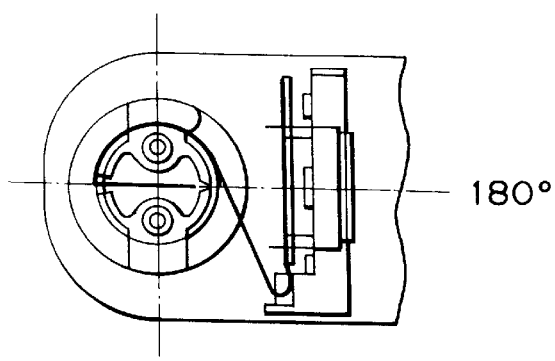
Figure 6D:
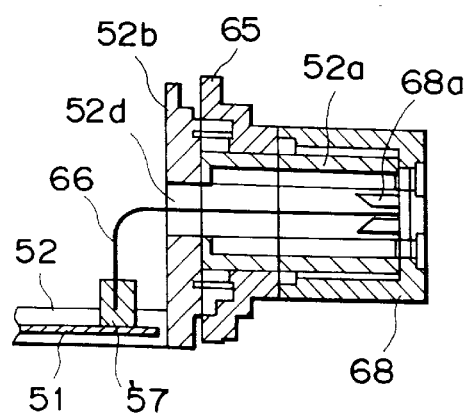

FIGS. 6A, 6B and 6C illustrate the wiring states of the flexible board when the image sensor head 60 is rotated by 0°, 90° and 180°, respectively. FIG. 6D is a sectional taken along line A—A of FIG. 6A.

As shown in FIGS. 6A through 6D, the CCD holding plate (holding member) 69 which holds the CCD (image sensing device) 13 is secured to the rotary plate 65. The holding plate 69 has a first regulating portion 69a for regulating the slack of the flexible board 66 and it is so arranged that stress received from the flexible board 66 when the image sensor head 60 is rotated will not act upon the lead portions of the CCD 13. Further, the first regulating portion 69a is so adapted that the flexible board 66 will develop slack at a desired position, thereby preventing the image sensor case 67 and the flexible board 66 from rubbing against each other.

A stopper member 68 for stopping rotation is secured to the rotary support portion 52a by screws with the rotary plate 65 sandwiched therebetween, and the image sensor head 60 is held so as to be rotatable from 0 to 180°. Furthermore, the rotary support portion 52a has a clamping portion 68a for clamping the flexible board 66 to limit movement of the flexible board 66 within the passageway 52d and assure the connection to the flexible connector 57, and a second regulating portion 68b for taking slack out of the flexible board 66. More specifically, the position of the second regulating portion 68b is set in such a manner that the flexible board 66 having the necessary length at the 180° position, which is one extreme of rotation, will have its slack removed at the 0 position, which is the other extreme of rotation.

The behavior of the flexible board 66 will now be described with reference to FIGS. 6A through 6D. At the 0° position, the flexible board 66 soldered to the lead portions of the CCD 13 is regulated by the first regulating portion 69a, engages the second regulating portion 68b and is wound up on the circumference of the stopper member 68. The flexible board 66 is connected to the flexible connector 57 upon being passed through the cut-away portion 52e and passageway 52d.

When the image sensor head 60 starts being turned under these conditions, the flexible board 66 separates from the second regulating portion 68b and is corrected by the first regulating portion 69a so as to be wound on the rotary support portion 52a, as shown in FIG. 6B. Thus, turning of the image sensor head 60 is made possible. When the image sensor head 60 is turned further, the flexible board 66 is wound up on the support portion 52a, as shown in FIG. 6C. The head 60 then comes to rest.

By virtue of this structure, application of stress to the connection between the leads of the CCD 13 and the flexible board 66 is eliminated to improve the reliability of the connections of the board 66. Further, the amount of slack developed by the flexible board 66 is minimized and the behavior of the flexible board 66 can readily be predicted. Furthermore, the stopper member 68 is provided with the board clamping portion 68a and the second regulating portion 68a, and the CCD holding plate 69 is provided with the first regulating portion 69a, thus making it possible to attain the above-mentioned effects with the minimum number of parts.

Thus, by providing the second regulating portion 68b for eliminating slack in the flexible board 66 at both ends of the predetermined angle of rotation at the connection of the flexible board which electrically connects the card body 50 and the image sensor head 60 supported on the main body of the device and turnable through the prescribed angle, the slack in the flexible board 66 at the time of rotation can be minimized and prediction of the slack is facilitated.

Further, the card body 50 has a support portion for supporting the image sensor head 60 turnable through the prescribed angle. The support portion has a passageway and the flexible board 66 is connected to the card body 50 upon being passed through the passageway. This makes it possible to turn the image sensor head 60 smoothly.

Further, the image sensor head 60 supported on the card body 50 and turnable through the prescribed angle is provided with the stopper member 68 for rotatably connecting the card body 50, and the stopper member 68 is provided with the regulating portion 68b. This makes it possible to reduce the number of parts.

Further, the stopper member 68 is provided with the portion 68a for clamping the flexible board 66 passed through the passageway 52d, as a result of which the behavior of the flexible board within the passageway 52d is regulated. This improves the reliability of the connections of the flexible board.

Further, the image sensor head 60 has the holding member 69 for holding the CCD 13, and the holding member 69 has the first regulating portion 69a for regulating the flexible board 66. The regulating portion 69a regulates the slackening of the flexible board and mitigates the stress that acts upon the connection between the flexible board 66 and the CCD 13. As a result, it is possible to improve further the reliability of the connection between CCD 13 and card body 50.

The foregoing is an example in which the structure for connecting the flexible board is applied to card-type image sensor. However, the structure is applicable also to other devices wherein the device, which turns relative to a main body, is connected by a flexible board.

Accordingly, in accordance with the above-described method of mounting the flexible board, the following effects are obtained:

(1) The regulating portions (68b, 69a) for eliminating slack in the flexible board are provided at both ends or extremes of the predetermined angle of rotation at the connection of the flexible board which electrically connects the main body of the device (the card body 50) and the device (the image sensor head 60) supported on the main body of the device and turnable through the prescribed angle. As a result, the slack in the flexible board at the time of rotation can be minimized and prediction of the slack is facilitated. Furthermore, a reduction in the size of the device is promoted by minimizing the amount of slack and it possible to prevent breakage of wiring and the like due to rubbing of the flexible board caused by unexpected behavior of slack developed by the board.

(2) The main body of the device has a support portion for supporting the device turnable through the prescribed angle, and the support portion has a hollow interior. As a result, the flexible board can be connected to the main body of the device upon being passed through the hollow portion. This makes it possible to turn the device smoothly.

(3) The device supported on the main body of the device and turnable through the prescribed angle is provided with the stopper member (68) for rotatably connecting the main body of the device, and the stopper member 68 is provided with the regulating portion (68b). This makes it possible to reduce the number of parts and to lower cost.

(4) The stopper member is provided with the portion (68a) for clamping the flexible board extending into the hollow portion. This improves the reliability of the connections of the flexible board.

A method of fixing the covers 53, 54 and 55 in the card-type image sensor set forth above will now be described in detail. In the panel structure of a conventional IC card, the covers 53, 54, 55 are fixed to the frame 52 by adhesive sheets such as double-sided tape or by a bonding agent.

Further, it is required that the covers 53 and 54 conduct electricity in order to make it possible for the semiconductor elements in the IC card to better withstand static electricity. To this end, the general practice is to form a hole in part of the frame 52 and insert a spring made of electrically conductive material into the hole so that the covers 53, 54 will be electrically communicated via the spring.

Though the card-type image sensor of this embodiment can be obtained by this conventional method, the above-described arrangement in which the covers 53, 54, 55 are secured to the frame 52 by adhesion lacks sufficient strength. Such strength is required since the card-type image sensor is frequently handled by the user at the time of operation. Further, using the electrically conductive spring to electrically communicate the covers 53, 54 increases the number of components and as well as the number of assembly steps.

Accordingly, described below will be a card structure designed to improve card rigidity, dispense with the spring for passing electrically communicating the covers 53, 54, reduce the number of parts and simplify the assembly operation.

Figure 7:
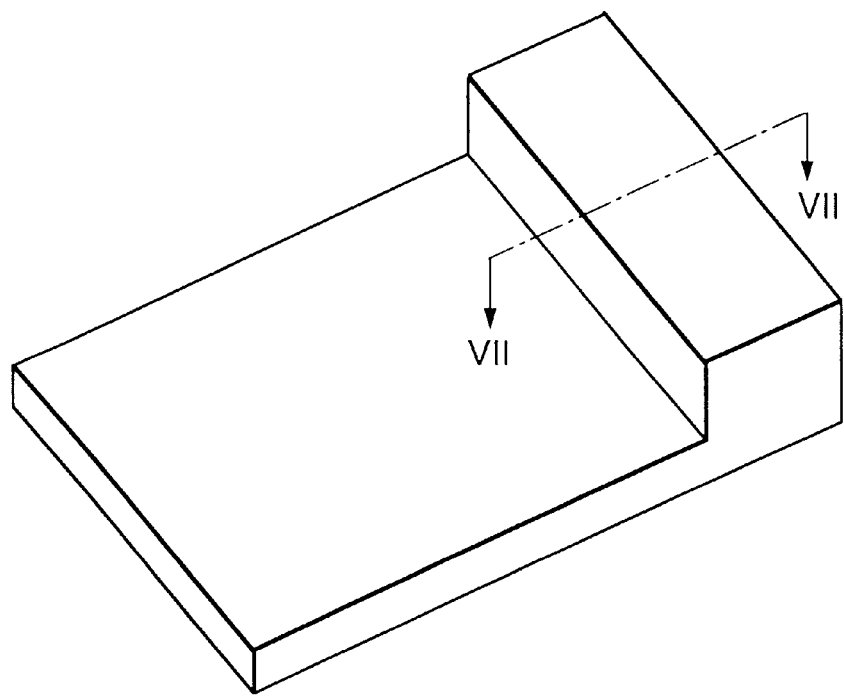
FIG. 7 is a diagram for describing another form of a card main body of the card-type image sensor according to the embodiment.

As shown in FIG. 7, the card body portion of the card-type image sensor of this embodiment is an IC card a portion of which is thickened in the longitudinal direction. Since a portion of this IC card is increased in thickness, the card cannot be formed by the pair of metal plates and the separate cover member (cover 55) is provided. An arrangement for realizing the improvement in card rigidity and resistance to static electricity in this case will now be described.

Figure 8:
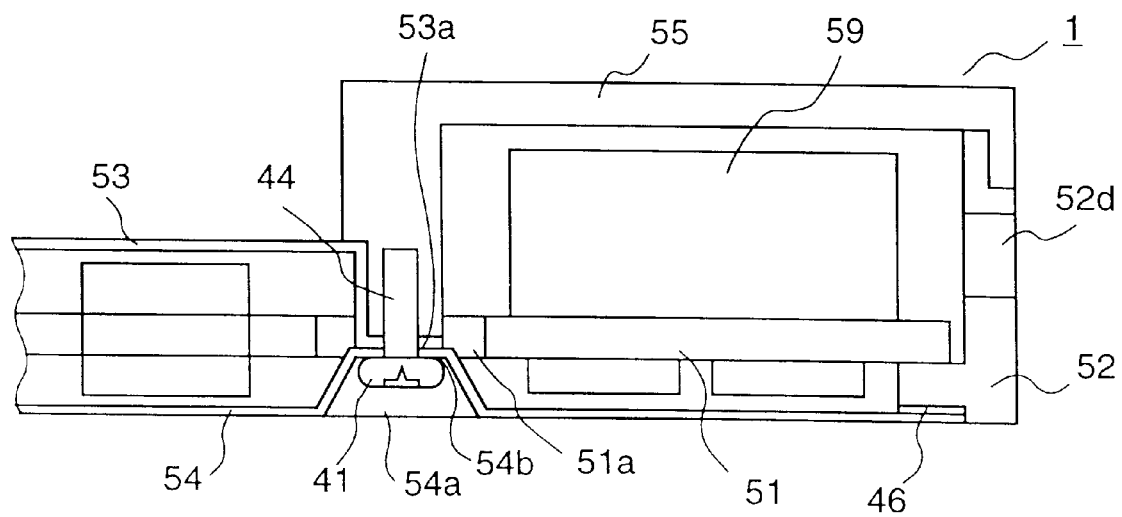
FIG. 8 is a sectional view taken along line VII—VII in FIG. 7.

FIG. 8 is a sectional view taken along line VII—VII of the card body constituting the card-type camera shown in FIG. 7. Components in FIG. 8 identical with those shown in FIG. 1 are designated by like reference characters. The cover 53 is provided with an ear portion 53a, and the cover 54 has a recess 54a deep enough so that the head of a tightening screw 41 will not project to the outside. The covers 53 and 54 are bonded to the frame 52 by a bonding agent 46. (FIG. 8 illustrates the state of adhesion between the cover 54 and the frame 52.) Further, the main board 51 has a hole 51a which allows the ear portion 53a and a planar portion 54b of the recess 54a to contact each other.

The cover 55 is secured to the frame 52 and has a female screw portion 44 into which the threaded portion of the tightening screw 41 is screwed. The covers 53 and 54 are joined to the cover 55 by the tightening screw 41. The covers 53 and 54 are joined by bringing the ear portion 53a having the planar portion and the planar portion 54b of the recess 54a into surface contact through the hole 51a in the main board 51. The front and back covers are thus rendered electrically conductive.

In accordance with the above-described method of fixing the covers, the tightening screw 41 mechanically joins the covers 53, 54 and 55 together. As a result, the rigidity of the card body 50 can be enhanced.

Further, the covers 52 and 53 are made conductive via the tightening screw 51. This improves the resistance to static electricity.

Since the covers 52 and 53 are rendered conductive by surface contact via the ear portion 53a and planar portion 54b, resistance to static electricity is improved further.

(Other Embodiment)

A further embodiment regarding the structure of an IC card in which the rigidity of the card body is improved and the resistance to static electricity is enhanced will now be described. Though the description that follows relates to a conventional IC card, it is obvious that the structure is applicable to the card body 50 of the card-type image sensor set forth above.

Figure 9:
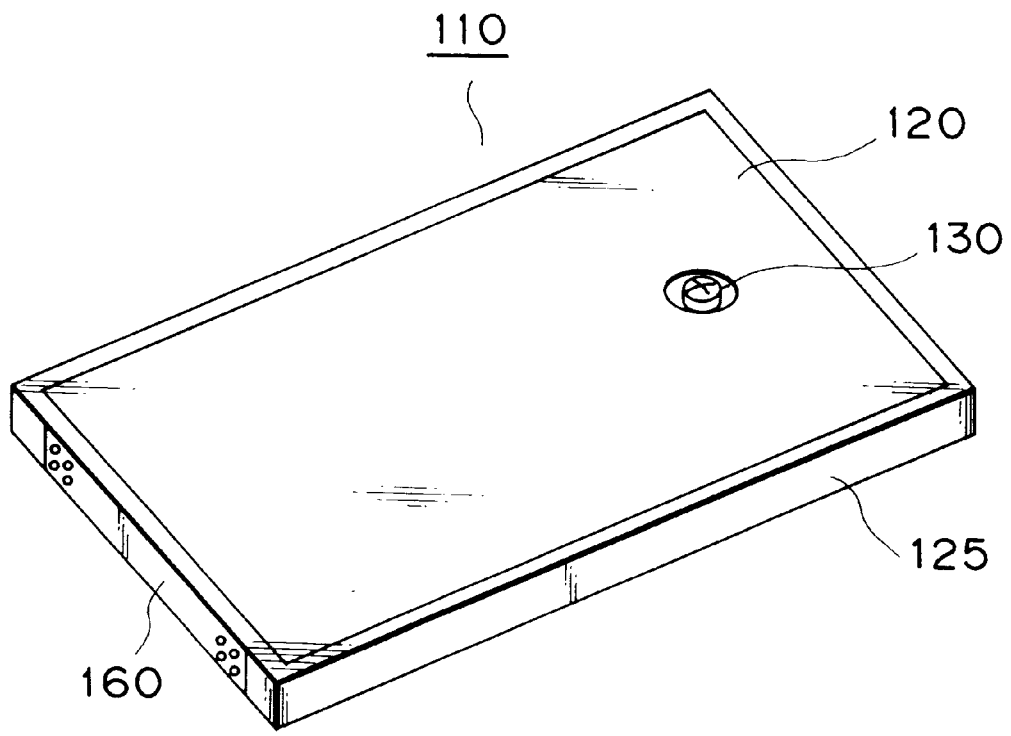
FIG. 9 is a perspective view showing the main components of an IC card according to another embodiment.

FIG. 9 is a perspective view showing an IC card 110 according to this embodiment. The IC card 110 has a panel 120 made of metal, a screw 130 for joining front and back panels, a frame 125 and a card connector 160 fitted into the slot of, say, a personal computer.

Figure 10:
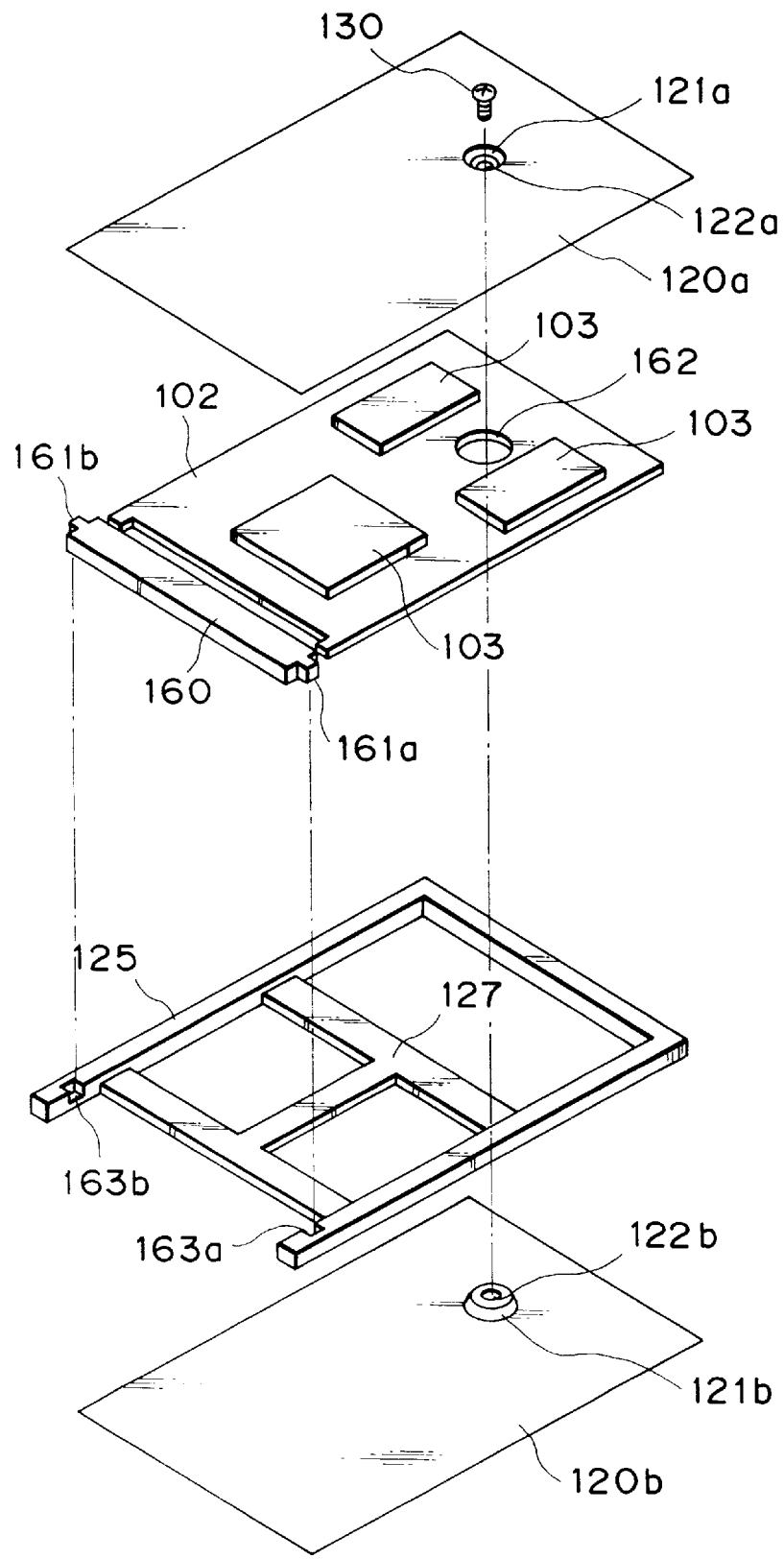
FIG. 10 is a perspective view showing the main components of an IC card according to the other embodiment.

FIG. 10 is an exploded perspective view of the IC card illustrating this embodiment. A front panel 120a is provided with a recess 121a deep enough so that the head of a tightening screw 130 will not project to the outside. Provided at the center of the recess is a hole 122a through which the screw 130 is passed. A back panel 120b is provided with a recess having a hub 122b into which the threaded portion of the screw 130 is screwed. An electrical circuit board 102 has an edge portion provided with a card connector 160 and has a plurality of semiconductor elements 103 mounted on at least one side. The board 102 is provided with a hole 162 at a location corresponding to the recesses 121a, 121b. A frame 125 surrounds and supports the electrical circuit board 102. The frame 125 has engaging portions 163a, 163b which engage with ear portions 161a, 161b of the connector 160 and is integrally provided with a rib 127, which is for enhancing the rigidity of the frame, at a position at which it will not interfere with the semiconductor elements 103 mounted on the electrical circuit board 102.

Figure 11:
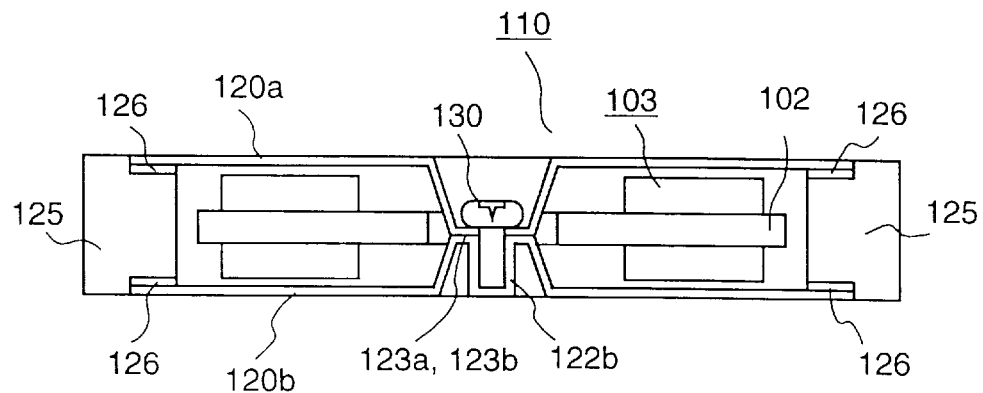
FIG. 11 is a partial sectional view showing the state of connection between the IC card and a shielding plate according to this embodiment.

FIG. 11 is a partial sectional view illustrating the tightened portion of the IC card 110 assembled using the front panel 120a and back panel 120b. The electrical circuit board 102 mounts the semiconductor elements 103, and the frame 125 surrounds and supports the electrical circuit board 102. The front panel 120a and back panel 120b are fixed to the frame 125 by a bonding agent 126 and are joined by the fastening screw 130, thereby increasing the rigidity of the IC card. The front panel 120a and back panel 120b are joined with the planar portion 123a of the recess 121a and the planar portion 123b of the recess 121b in surface contact. The front and back panels are thus made electrically conductive.

A modification of this embodiment will be described with reference to FIG. 12. Elements in FIG. 12 identical with those of the foregoing embodiment are designated by like reference characters.

Figure 12:
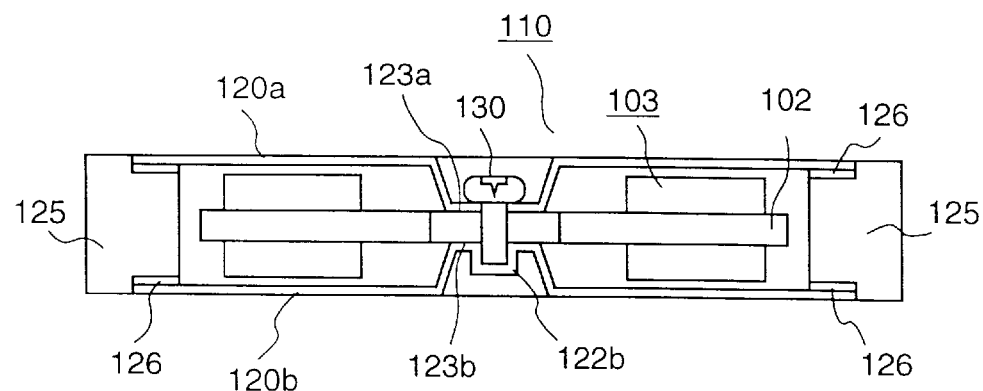
FIGS. 12 and 13 are partial sectional views showing the state of connection between the IC card and shielding plate according to a modification of this embodiment.

FIG. 12 is a partial sectional view illustrating the tightened portion of the IC card 110 assembled using the front panel 120a and back panel 120b. The electrical circuit board 102 mounts the semiconductor elements 103, and the frame 125 surrounds and supports the electrical circuit board 102. The front panel 120a and back panel 120b are fixed to the frame 125 by the bonding agent 126 and are joined by the fastening screw 130 via the electrical circuit board 102. The front panel 120a and back panel 120b are joined with the planar portion 123a of the recess 121a and the planar portion 123b of the recess 121b in surface contact with the electrical circuit board 102. The surfaces of contact between the electrical circuit board 102 and the panels are brought into electrical contact with each other via a through-hole. As a result, the front and back panels are thus made electrically conductive.

A modification of this embodiment will be described with reference to FIG. 13. Elements in FIG. 13 identical with those of the foregoing embodiment are designated by like reference characters.

Figure 13:
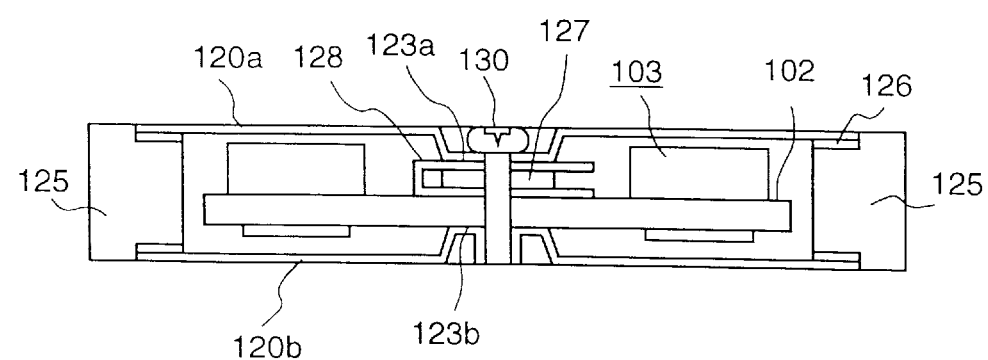
Figure 14:
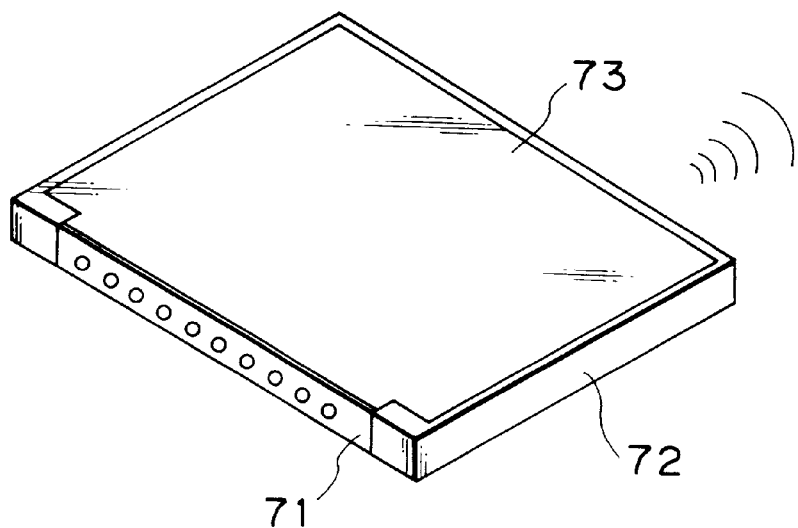
FIG. 14 is a perspective view showing the external appearance of a card for infrared communication according to the prior art.
Figure 15:
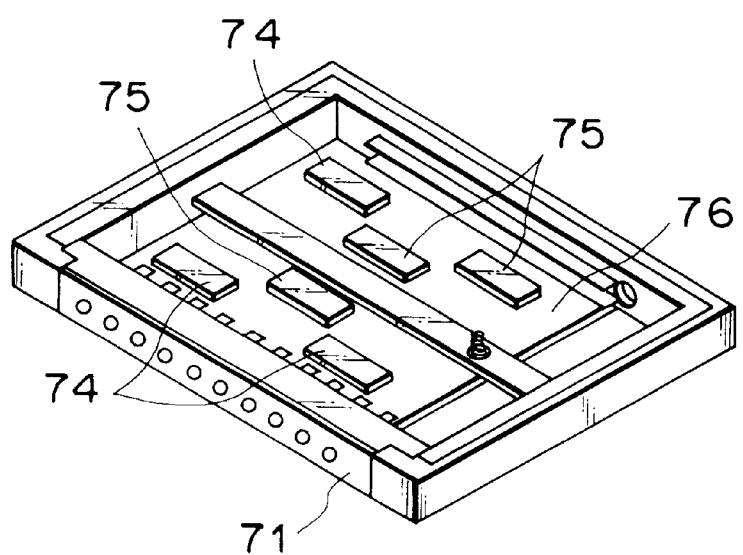
FIG. 15 is a perspective view showing the interior of the card depicted in FIG. 14.
Figure 16:
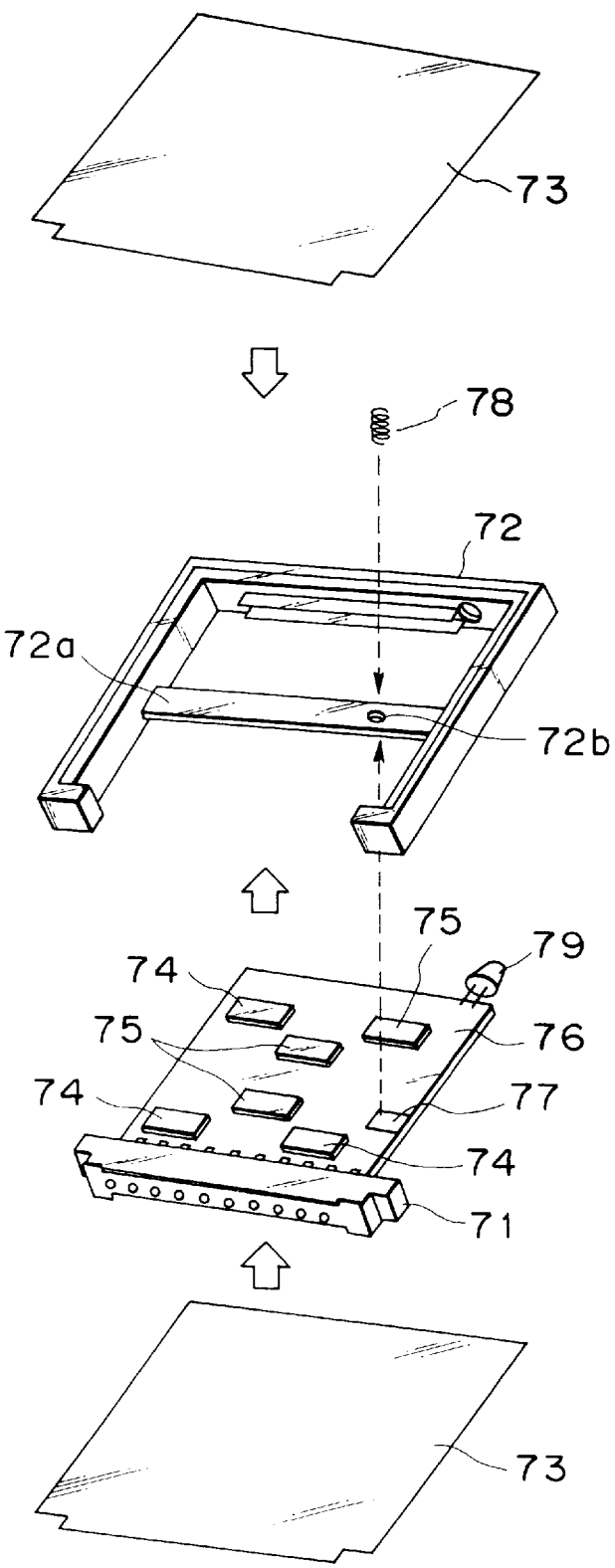
FIG. 16 is an exploded perspective view showing the architecture of the card of FIG. 14.

FIG. 13 is a partial sectional view illustrating the tightened portion of the IC card 110 assembled using the front panel 120a and back panel 120b. The electrical circuit board 102 mounts the semiconductor elements 103, and the frame 125 surrounds and supports the electrical circuit board 102. The front panel 120a and back panel 120b are fixed to the frame 125 by the bonding agent 126. The frame 125 is integrally provided with the reinforcing rib 127 at a position at which it will not interfere with the semiconductor elements 103 mounted on the electrical circuit board 102. In the foregoing embodiment, the design is such that the tightened portion and rib 127 are positioned so as not to interfere with each other. In the modification of FIG. 13, however, the position of the rib 127 is shifted and the front panel 120a and back panel 120b are joined by the tightening screw through the intermediary of the electrical circuit board 102 and rib 127. Since the frame 125 usually is made of plastic, the rib 127 is provided with a metal bracket 128 to bring the upper and lower surfaces of the rib into electrical conduction. In terms of the connection between the front panel 120a and back panel 120b, the surfaces at which the planar portion 123a of the recess and the circuit board brought into electrical conduction via the through-hole are in surface contact, these surfaces of contact and the bracket 128 are in surface contact, and the bracket 128 and planar portion of the recess are in surface contact. As a result, the front and back panels 120a, 120b are made electrically conductive. In this arrangement, the electrical circuit board 102, the frame 125 and the front and back panels 120a, 120b are joined. This provides the IC card with greater mechanical rigidity. Further, since it suffices for one end of the metal bracket 128 to be electrically connected to a surface of contact of the circuit board, the invention is not limited to this arrangement.

With regard to the connecting of the covers 53, 54, 55 described in conjunction with FIG. 8, only the front and back panels are fastened together by the tightening screw. However, if the arrangement of the modification of FIG. 12 or FIG. 13 is adopted, the card can be provided with greater rigidity.

Thus, in accordance with the other embodiment and its modifications set forth above, an IC card has an electrical circuit board on which semiconductor elements are mounted, a frame disposed to surround the electrical circuit board and having a rib provided at a position at which it will not interfere with the semiconductor elements mounted on the electrical circuit board, front and back panels made of metal secured to the frame for covering the circuit board from both sides, and a connecting member for joining the panels to each other. Since the connecting member electrically joins at least the front and back panels, the rigidity of the IC card can be increased.

As many apparently widely different embodiments of the present invention can be made without departing from the spirit and scope thereof, it is to be understood that the invention is not limited to the specific embodiments thereof except as defined in the appended claims.

What is claimed is:

1. An image sensor comprising:
   a card which includes a circuit board mounting electronic parts;
   an image sensing unit supported on a frame forming said card; and
   a power supply unit for generating a voltage necessary to drive said image sensing unit;
   wherein said card has an exposed portion exposed from an electronic device when the card has been loaded in the electronic device, and an unexposed portion which is inserted into the electronic device when the card has been loaded in the electronic device, said power supply unit being arranged on said exposed portion.

2. The image sensor according to claim 1, further comprising:
   a first cover member for covering said unexposed portion of said card; and
   a first shielding member for covering at least said power supply unit at said exposed portion;
   at least said first shielding member being connected to a ground terminal of said circuit board.

3. The image sensor according to claim 2, wherein a portion of said first shielding member extends between said first cover member and said circuit board.

4. The image sensor according to claim 1, wherein said power supply unit includes at least a DC/DC converter.

5. The image sensor according to claim 1, wherein said circuit board has:
   an analog circuit for processing an image signal from said image sensing unit;
   a digital circuit for digitally processing the image signal; and
   a connector portion for performing communication with said electronic device;
   said analog circuit being disposed at a position remote from said connector portion.

6. The image sensor according to claim 5, further comprising a second shielding member for covering all or part of said analog circuit.

7. The image sensor according to claim 6, wherein at least part of said second shielding member exhibits resilience and a portion of said second shielding member resiliently contacts a ground pattern provided on said circuit board, whereby said second shielding member is electrically connected to said ground pattern.

8. The image sensor according to claim 7, wherein part of said second shielding member resiliently contacts the first cover member covering said circuit board, whereby said second shielding member is electrically connected to said first cover member.

9. The image sensor according to claim 6, wherein said frame has positioning means for deciding a position at which said second shielding member is attached.

10. The image sensor according to claim 1, further comprising:

a support portion provided on said frame for supporting said image sensing unit on said card in such a manner that said image sensing unit is capable of being rotated within a predetermined angular range;

a flexible wiring board for electrically connecting said image sensing unit and said card; and a regulating portion provided at both extremes of rotational movement of said image sensing unit within said predetermined angular range, said regulating portion regulating slack of said flexible wiring board within said image sensing unit.

11. The image sensor according to claim 10, wherein said support portion has a hollow interior communicating said image sensing unit and said card, and said flexible wiring board is connected to said image sensing unit and said card through said hollow interior.

12. The image sensor according to claim 10, further comprising a stopper member attached to said support portion for holding said image sensing unit on said support portion and for limiting rotation of said image sensing unit to said predetermined angular range.

13. The image sensor according to claim 12, wherein said support portion has a hollow interior communicating said image sensing unit and said card, and said flexible wiring board is connected to said image sensing unit and said card through said hollow interior, and said stopper member has a clamping portion for clamping said flexible wiring board in said hollow interior of said support portion, thereby regulating behavior of said flexible wiring board in said hollow interior.

14. The image sensor according to claim 10, wherein said flexible wiring board is connected to a holding member which holds an image sensing device within said image sensing unit, said holding member regulating direction of slack developed by said flexible wiring board.

15. The image sensor according to claim 1, further comprising:

a first cover member for covering at least said unexposed portion of said card, said first cover member including a front panel and a back panel secured to said frame so as to embrace said circuit board;

a second cover member for covering at least said exposed portion; and connecting means for mechanically interconnecting said front panel, said back panel and said second cover member.

16. The image sensor according to claim 15, wherein said connecting means secures said front panel, said back panel and said second cover member by a screw via holes in said front and back panels and a threaded portion provided on said second cover member.

17. The image sensor according to claim 16, wherein the periphery of the holes in said front and back panels and the periphery of the threaded portion of said second cover member are formed to have a planar portion.

18. The image sensor according to claim 15, further comprising second connecting means for connecting said front panel and said back panel electrically and mechanically via planar portions.

19. The image sensor according to claim 18, wherein said second connecting means connects said front and back panels via a hole provided in said circuit board.

20. The image sensor according to claim 18, wherein said second connecting means mechanically secures said front and back panels with said circuit board sandwiched therebetween, and said circuit board has a through-hole pattern at an area of contact between said front and back panels.

21. The image sensor according to claim 18, wherein said second connecting means connects said front and back panels via a hole provided in said circuit board.

22. The image sensor according to claim 18, wherein said second connecting means mechanically secures said front and back panels with said circuit board and said frame sandwiched therebetween, said circuit board has a through-hole pattern at an area of contact between said back panel and said frame, and said frame has an electrically conductive member at an area of contact between said circuit board and said front panel.

23. The image sensor according to claim 1, wherein the exposed portion of said card includes a thickened portion that is thicker than that of the unexposed portion of said card, and said power supply unit is arranged on the thickened portion.

24. The image sensor according to claim 23, wherein said power supply unit has a converter that converts a voltage supplied from the electronic device to a voltage appropriate for said image sensing unit.

25. An image sensor comprising:

a card which includes a circuit board mounting electronic parts;

an image sensing unit supported on a frame forming said card;

a support portion provided on said frame for supporting said image sensing unit on said card in such a manner that said image sensing unit is capable of being rotated within a predetermined angular range;

a flexible wiring board for electronically connecting said image sensing unit and said card; and a regulating portion provided at both extremes of rotational movement of said image sensing unit within said predetermined angular range, said regulating portion regulating slack of said flexible wiring board within said image sensing unit, wherein said flexible wiring board is connected to a holding member which holds an image sensing device within said image sensing unit, said holding member regulating direction of slack developed by said flexible wiring board.

26. The image sensor according to claim 25, wherein said support portion has a hollow interior communicating said image sensing unit and said card, and said flexible wiring board is connected to said image sensing unit and said card through said hollow interior.

27. The image sensor according to claim 25, further comprising a stopper member attached to said support portion for holding said image sensing unit on said support portion and for limiting rotation of said image sensing unit to said predetermined angular range.

28. The image sensor according to claim 27, wherein said support portion has a hollow interior communicating said image sensing unit and said card, and said flexible wiring board is connected to said image sensing unit and said card through said hollow interior, and said stopper member has a clamping portion for clamping said flexible wiring board in said hollow interior of said support portion, thereby regulating behavior of said flexible wiring board in said hollow interior.

29. An image sensor comprising:

a card which includes a circuit board mounting electronic parts;

an image sensing unit supported on a frame forming said card; and a support portion provided on said frame for supporting said image sensing unit on said card in such a manner that said image sensing unit is capable of being rotated within a predetermined angular range;

a flexible wiring board for electrically connecting said image sensing unit and said card;

a regulating portion provided at both extremes of rotational movement of said image sensing unit within said predetermined angular range, said regulating portion regulating slack of said flexible wiring board within said image sensing unit, a stopper member attached to said support portion for holding said image sensing unit on said support portion and for limiting rotation of said image sensing unit to said predetermined angular range, wherein said support portion has a hollow interior communicating said image sensing unit and said card, and said flexible wiring board is connected to said image sensing unit and said card through said hollow interior, and said stopper member has a clamping portion for clamping said flexible wiring board in said hollow interior of said support portion, thereby regulating behavior of said flexible wiring board in said hollow interior. other.

* * * * *

UNITED STATES PATENT AND TRADEMARK OFFICE
CERTIFICATE OF CORRECTION

PATENT NO. : 5,991,468

DATED : November 23, 1999

INVENTOR(S): Murakami et al.

It is certified that error appears in the above-identified patent and that said Letters Patent is hereby corrected as shown below:

ON THE TITLE PAGE

Under Item [56] US PATENT DOCUMENTS :

After "5,644,410    7/1997    Suzuki et al" insert -- 358/473 --
    After "5,708,515    1/1998    Nishima et al" insert -- 358/474 --
    After "5,475,441    12/95     Parulski et al" insert -- 348/552 --

Under OTHER PUBLICATIONS, insert:

English Translation of Patent Abstract of Japan, Vol. 95, No. 005, May 12, 1995

Col. 11, line 48, delete "0 position" and insert therefor -- 0° position --.

Co. 20, line 12, after "interior." delete "other."

UNITED STATES PATENT AND TRADEMARK OFFICE
CERTIFICATE OF CORRECTION

PATENT NO. : 5,991,468

DATED : November 23, 1999

INVENTOR(S) : Murakami et al.

It is certified that error appears in the above-identified patent and that said Letters Patent is hereby corrected as shown below:

ON THE TITLE PAGE

Under "FOREIGN PATENT DOCUMENTS" please insert:

0 683 597, 11/22/96, Europe
WO 96/07269A1, 3/7/96, PCT
WO 94/14274, 6/23/94, PCT
0 581 286A1, 2/2/94, Europe Under "OTHER PUBLICATIONS" insert:

"PCMCIA Video Camera for Mobile Computing", Electronic Engineering, Vol. 66, No. 814, 10/1/94

"Integrated Computer and Camera", IBM Technical Disclosure Bulletin Vol. 37, No. 10, 10/1/94

Signed and Sealed this

Twenty-seventh Day of March, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,991,468
DATED : November 23, 1999
INVENTOR(S) : Murakami et al.

It is certified that error appears in the above-identified patent and that said Letters Patent is hereby corrected as shown below:

<u>Title page,</u>
Item [56], References Cited, FOREIGN PATENT DOCUMENTS, insert the following:
-- 0 683 596 11/22/96, Europe --.

Signed and Sealed this

Second Day of November, 2004

JON W. DUDAS
*Director of the United States Patent and Trademark Office*